US006942899B2

(12) United States Patent
Kendig et al.

(10) Patent No.: US 6,942,899 B2
(45) Date of Patent: Sep. 13, 2005

(54) COATING FOR INHIBITING OXIDATION OF A SUBSTRATE

(75) Inventors: Martin W. Kendig, Thousand Oaks, CA (US); Melitta Hon, Van Nuys, CA (US); Leslie Warren, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 10/190,932

(22) Filed: Jul. 8, 2002

(65) Prior Publication Data

US 2004/0005478 A1 Jan. 8, 2004

(51) Int. Cl.[7] .................................................. B05D 7/14
(52) U.S. Cl. .................................................... 427/385.5
(58) Field of Search ...................................... 427/385.5

(56) References Cited

U.S. PATENT DOCUMENTS

| | | |
|---|---|---|
| 4,502,929 A | 3/1985 | Stewart et al. |
| 4,990,231 A | 2/1991 | Stewart et al. |
| 5,077,096 A | 12/1991 | Sharaby |
| 5,458,955 A | 10/1995 | Vaughn et al. |
| 5,532,025 A | 7/1996 | Kinlen et al. |
| 5,645,890 A | 7/1997 | MacDiarmid et al. |
| 5,648,416 A | 7/1997 | Miller et al. |
| 5,658,649 A | 8/1997 | Wrobleski et al. |
| 5,712,034 A | 1/1998 | Stevens et al. |
| 5,721,056 A | 2/1998 | Wessling |
| 5,779,818 A | 7/1998 | Wessling |
| 5,824,371 A | 10/1998 | Epstein et al. |
| 5,853,462 A | 12/1998 | Spellane et al. |
| 5,928,795 A | 7/1999 | Spellane et al. |
| 5,993,567 A | 11/1999 | Dolan |
| 6,015,613 A | 1/2000 | Kinlen et al. |
| 6,054,514 A | 4/2000 | Kulkarni |
| 6,060,116 A | 5/2000 | Kulkarni et al. |
| 6,117,558 A | 9/2000 | Spellane et al. |
| 6,139,610 A | 10/2000 | Sinko |
| 6,150,032 A | 11/2000 | Yang et al. |
| 6,328,874 B1 | 12/2001 | Kinlen et al. |

FOREIGN PATENT DOCUMENTS

| | | |
|---|---|---|
| EP | 0821040 A1 | 1/1998 |
| EP | 0870549 A1 | 10/1998 |
| EP | WO 99/25778 | 5/1999 |
| EP | WO 02/13671 A2 | 2/2002 |
| FR | 2774398 | 2/1998 |

OTHER PUBLICATIONS

Full text and CA abstract of Dominis et al, Athens Conference on Coatings, Science and Technology, Proc., Jul. 2–6, 2001, pp 389–398.*

Dominis et al, Athens Conference on Coating: Science and Technology, Proc., Jul. 2–6, 2001, pp 389–398.*

Shah et al, Key Engineering Materials, 197, pp 111–120, 2001.*

Copy of European Search Report dated Oct. 2, 2003.

(Continued)

*Primary Examiner*—Erma Cameron
(74) *Attorney, Agent, or Firm*—Harness, Dickey & Pierce P.L.C.

(57) ABSTRACT

A film which may be placed on a metallic substrate to inhibit corrosion of the substrate when in a corrosive environment. The film also inhibits corrosion at a defect area in the film when the substrate is exposed in the presence of a corrosive environment. The film includes dopants which release from the film when corrosion begins at a film defect. Therefore, the film not only inhibits corrosion where the film is undamaged, but also inhibits corrosion at the site of a defect in the film. Advantageously, the system does not lose its effectiveness over a given period of time if no defect occurs in the substrate.

26 Claims, 3 Drawing Sheets

OTHER PUBLICATIONS

G. O. Ilevbare and J. R. Scully, Mass–Transport–Limited Oxygen Reduction Reaction on AA2024–T3 and Selected Intermetallic Compounds in Chromate–Containing Solutions, Corrosion, pp. 134–152 (2001).

G. O. Ilevbare and J. R. Scully, Oxygen Reduction Reaction Kinetics on Chromate Conversion Coated Al–Cu, Al–cu–Mg, and Al–Cu–Mn–Fe Intermetallic Compounds, Journal of The Electrochemical Society, pp. B196–B207 (2001).

G. O. Ilevbare, C. S. Jeffcoate and J. R. Scully, Mass Transport Limited Oxygen Reduction Kinetics On Chromate Conversion Coated Al–Cu–, Al–Cu–Mg And Al–Cu–Mn–Fe Intermetallic Compounds, Electrochemical Society Proceedings vol. 99–27, pp. 269–279, (1999).

K. Vetter, Electrochemical Kinetics–Theoretical and Experimental Aspects, Academic Press, New York, pp. 188–199 (1967).

B. Wessling, Corrosion Prevention with an Organic Metal (Polyaniline): Surface Ennobling, Passivation, Corrosion Test Results, 1996, pp. 439–445.

Bernhard Wessling, Scientific and Commercial Breakthrough for Organic Metals, 1997, pp. 1313–1318.

C. Jerome, L. Martinot, D. Strivay, G. Weber, R. Jerome, Controlled Exchange of Metallic Cations by Polypyrrole–Based Resins, May 9, 2000, pp. 45–55.

D. E. Tallman, C. Vang, G. G. Wallace, and G. P. Bierwagen, Direct Electrodeposition of Polypyrrole on Aluminum and Aluminum Alloy by Electron Transfer Mediation, Jul. 24, 2001, pp. C173–C719.

David W. DeBerry, Modification of the Electrochemical and Corrosion Behavior of Stainless Steels with an Electroactive Coating, May 1985, pp. 1022–1026.

Debra A. Wrobleski and Brian C. Benicewicz, Corrosion Resistant Coatings From Conducting Polymers, 1994, pp. 265–266.

Dr. John Sinko, Considerations On The Chemistry And Action Mechanism Of Corrosion Inhibitor Pigments In Organic Coatings, 6$^{th}$ Biennial Conference on Science and Technology of Organic Coatings, Nov. 5–8, 2000, Hilton Head Island, South Carolina.

E. W. Brooman, Modifying Organic Coatings to Provide Corrosion Resistance—Part III: Organic Additives and Conducting Polymers, Jun. 2002, pp. 104–110.

F. Bentiss, M. Traisnel and M. Lagrenee, Influence of 2,5–Bis(4–Dimethylaminophenyl)–1,3,4,–Thiadiazole On Corrosion Inhibition Of Mild Steel In Acidic Media, Jul. 5, 2000, pp. 41–47.

G. O. Illevbare and J. R. Scully, Oxygen Reduction Reaction Kinetics on Chromate Conversion Coated Al–Cu, Al–Cu–Mg, and Al–Cu–Mn–Fe Intermetallic Compounds, Journal of The Electrochemical Society, 148 (5) B196–B207 (2001).

Gerald S. Frankel, The Ohio State University Fontana Corrosion Center, Mechanism of Al Alloy Corrosion and the Role of Chromate Inhibitors, Dec. 1, 2001.

H. Nguyen Thi Le, B. Garcia, C. Deslouis and Q. Le Xuan, Corrosion Protection of Iron by Polystyrenesulfonate–doped Polypyrrole Films, Oct. 16, 2001, pp. 105–110.

Jean–Michel Pernaut, and John R. Reynolds, Use of Conducting Electroactive Polymers for Drug Delivery and Sensing of Bioactive Molecules. A Redox Chemistry Approach, Mar. 30, 2000, pp. 4080–4090.

Jie He, Victoria Johnston Gelling, Dennis Tallman, Gordon P. Bierwagen, and Gordon G. Wallace, Conducting Polymers and Corrosion III. A Scanning Vibrating Electrode Study of Poly(3–octyl pyrrole) on Steel and Aluminum, Jan. 10, 2001, pp. 3667–3672.

John Sinko, Challenges of Chromate Inhibitor Pigments Replacement in Organic Coatings ,XXV Athens Conference, pp. 257–276, 1999.

John Sinko, Challenges of Chromate Inhibitor Pigments Replacement in Organic Coatings, Progress in Organic Coatings 42 (2001) 267–282.

Joseph Wang, Gustavo Rivas, Mian Jiang, and Xueji Zhang, Electrochemically Induced Release of DNA from Gold Ultramicroelectrodes, Apr. 29, 1999, pp. 6541–6545.

M. Fahlman, S. Jasty and A. J. Epstein, Corrosion Protection of Iron/Steel by Emeraldine Base Polyaniline: An X–ray Photoelectron Spectroscopy Study, 1997, pp. 1323–1326.

M. Kendig and S. Jeanjaquet, Cr(VI) and Ce(III) Inhibition of Oxygen Reduction on Copper, Journal of The Electrochemical Society, 149 (2) B47–B51 (2002).

M. Perucki and P. Chandrasekhar, Corrosion Protection of Aluminum Alloys by Coatings of Unique Poly(diphenyl amine)–derivative conducting polymers, 2001, pp. 385–386.

Marie Claude Bernard, Suzanne Joiret, Anne Hugot–LeGoff, and Phan Viet Phong, Protection of Iron Against Corrosion Using a Polyaniline Layer I. Polyaniline Electrodeposit, Apr. 20, 2000, pp. B12–B16.

Naseer Ahmad, Alan G. MacDiarmid, Inhibition of Corrosion of Steels with the Exploitation of Conducting Polymers, Sep. 19, 1995, pp. 103–110.

Ormecon, Technical Data Sheet: Corrpassiv R 4001 Primer, Apr. 1997.

Ormecon, Technical Data Sheet: Corrpassiv R 4002 Primer, Apr. 2001.

P. J. Kinlen, D. C. Silverman and C. R. Jeffreys, Corrosion Protection Using Polyaniline Coating Formulations, 1997, pp. 1327–1332.

P. Zarras, J. D. Stenger–Smith and M. H. Miles, Corrosion Inhibition of Aluminum Alloys Coated with Poly(2,5–Bis–(N–Methyl–N–Alkylamino) Phenylene Vinylenes, 1997, pp. 589–590.

Patrick J. Kinlen, Vinod Menon, and Yiwei Ding, A Mechanistic Investigation of Polyaniline Corrosion Protection Using the Scanning Reference Electrode Technique, May 21, 1999, pp. 3690–3695

Qijin Chi, Tetsu Tatsuma, Masahide Ozaki, Tadashi Sotomura, and Noboru Oyama, Electrochemical Behavior and Surface Morphologic Changes of Copper Substrates in the Presence of 2,5–Dimercapto–1,3,4,–Thiadiazole, Jul. 1998, pp. 2369–2377.

Rahela Gasparac and Charles R. Martin, The Effect of Protic Doping Level on the Anticorrosion Characteristics of Polyaniline in Sulfuric Acid Solutions, Oct. 1, 2001, pp. B409–B413.

Robert Racicot, Richard Brown, Sze C. Yang, Corrosion Protection of Aluminum Alloys by Double–Strand Polyaniline, 1997, pp. 1263–1264.

S. Ren and D. Barkey, Electrochemically Prepared Poly(3–Methylthiophene) Films for Passivation of 430 Stainless Steel, Apr. 1992, pp. 1021–1026.

Solange de Souza, Jose E. Pereira da Silva, Susana I. Cordoba de Torresi, Marcia L. A. Temperini, and Roberto M. Torressi, Polyaniline Based Acrylic Blends for Iron Corrosion Protection, Oct. 28, 2000, pp. B27–B30.

Srinivas P. Sitaram, Pu Yu, Thomas O'Keefe, James O. Stoffer and Patrick J. Kinlen, Evaluation of Conducting Polymers in Corrosion Protection, 1996, pp. 352–353.

Stuart F. Cogan, Michael D. Gilbert, Gerhard L. Holleck, Julia Ehrlich, and Michael H. Jillson, Galvanic Coupling of Doped Polyaniline and Aluminum Alloy 2024–T3, Nov. 1, 1999, pp. 2143–2147.

Wei–Kang Lu, Ronald L. Eisenbaumer, and Bernhard Wessling, Corrosion Protection of Mild Steel by Coatings Containing Polyaniline, 1995, pp. 2163–2166.

William J. Clark, Jeremy D. Ramsey, Richard L. McCreery, and Gerald S. Frankel, A Galvanic Corrosion Approach to Investigating Chromate Effects on Aluminum Alloy 2024–T3, Journal of The Electrochemical Society, 149, Dec. 3, 2001, pp. B179–B185.

G. O. Ilebare, and J. R. Scully, Oxygen Reduction Reaction Kinetics on Chromate Conversion Coated Al–Cu, Al–Cu–Mg, and Al–Cu–Mn–Fe Intermetallic Compounds, Journal of The Electrochemical Society, 148, Dec. 21, 2000, pp. B196–B207.

Jeremy D. Ramsey, Lin Xia, Martin W. Kendig, Richard L. McCreery, Raman Spectroscopic Analysis of the Speciation of Dilute Chromate Solutions, Corrosion Science 43 (2001), Aug. 14, 2000, pp. 1557–1572.

Martin W. Kendig, Mechanism of Corrosion Protection of Aluminum Alloys by Chromate, Rockwell Science Center LLC, Sample Proceedings (2001), 10 pages.

William J. Clark and Richard L. McCreery, Inhibition of Corrosion–Related Reduction Processes via Chromium Monolayer Formation, Journal of the Electrochemical Society, 149, (9), Feb. 27, 2002, pp. B379–B386.

G. O. Ilevbare and J. R. Scully, Mass–Transport–Limited Oxygen Reduction Reaction on AA2024–T3 and Selected Intermetallic Compounds in Chromate–Containing Solutions, Sep. 2000, pp. 1–15.

* cited by examiner

COATING FOR INHIBITING OXIDATION OF A SUBSTRATE

FIELD OF THE INVENTION

The present invention relates to corrosion inhibiting coatings, and more particularly relates to corrosion inhibiting coatings that both indicate corrosion is occurring and that provide an active inhibition function when conditions for corrosion exist.

BACKGROUND OF THE INVENTION

In many applications, a metal structure or substrate may become corroded or oxidized when exposed to a particular atmosphere. Precautions can be taken to prevent such corrosion, but generally it occurs if a particular metal is exposed to a particular environment for an extended period of time. Many applications exist, such as automotive bodies and frames and aerospace application, where metal structures of vehicles are constantly exposed to extremely corrosive atmospheric conditions.

One mechanism of metallic corrosion is a galvanic reaction between the metal and the environment surrounding the metal. For example, oxygen in the atmosphere oxidizes the metal through a transfer of electrons from the metal to the oxygen at electrocatalytic sites on the metal surface and subsequent combination of the resulting metal cation with the oxygen anion to form a non-structural metal oxide corrosion product. In particular, water vapor acts as the electrolyte allowing oxygen to react with the metal. It has been proposed that conducting polymers can provide a pacification of this reaction by creating an anodic pacification. A coating is placed over the metallic substrate such that no reaction may occur unless there is an imperfection in the coating. When an imperfection occurs and the electrode reaction begins the conducting polymer acts as a cathode so as to supply a low but sufficient current to form a protective metal oxide film on the surface of the metal within the exposed defect.

Other films or coatings have been used which include hexavalent chromium, also referred to as chromate. In these coatings, the chromate acts as an inhibitor since it is water-soluble and reacts with the metal to form a barrier layer composed of the metal oxide and $Cr_2O_3$. In this reaction the metal is oxidized (looses electrons) and the chromate is reduced (gains electrons to go from the six valent chromate to the three valent $Cr_2O_3$). Preferably, the coating retains a portion of the chromate that can be released to protect the metal at imperfections in the film.

In this way, when an imperfection occurs and the electrode reaction is initiated, the chromate remaining in the film may migrate through the film and block the corrosion reaction with the atmosphere. In particular, the chromate moves into the imperfection of the coating to react with the metallic substrate thereby forming a protective layer. Nevertheless, a slow release of the chromate over time can reduce its availability to be released at the appropriate time. Although chromate is useful in this application, chromate may be toxic if ingested in sufficient amounts in a living organism. Therefore, strict and costly standards must be adhered to when using and disposing of the materials coated with the chromate.

Therefore, it is desirable to provide a coating which provides the blocking effects of chromate, but which is substantially not harmful to living organisms. In addition, it is desirable to provide a coating which produces an active or "smart" inhibition of the galvanic reaction created between a metallic substrate and the atmosphere when an imperfection in the coating occurs. It is desired to produce a coating which provides substantial inhibition to corrosion of a metallic substrate by the release of a blocking or inhibiting constituent into the defect to stop the corrosion of the metallic substrate.

SUMMARY OF THE INVENTION

The present invention, in one preferred form, provides a film or coating that may include a top coat or primer which may be placed on a metallic substrate to inhibit or help prevent corrosion of the substrate when in a corrosive environment. Generally, a coating may be placed on a substrate to inhibit corrosion of the substrate due to a corrosive environment. In addition, these coatings also inhibit corrosion when the coating includes a defect either because of manufacturing or due to damage. Therefore, the coating not only inhibits corrosion where the coating is undamaged, but also inhibits corrosion at the site of a defect in the coating.

The coatings of the present invention include "active" or "smart" corrosion inhibitors which may migrate to the defect to prevent corrosion in that area. This migration occurs after the defect has occurred in the coating and an oxidation/reduction reaction has begun. The reaction generally creates a galvanic reaction of the metallic substrate. In particular, the metal substrate becomes oxidized due to the oxidizing atmosphere. Once this reaction has begun, the active inhibitors, generally anions of various formulas, migrate to the reaction site and become participants in the reaction. The anions of the coating are released when the coating is galvanically coupled to the metal defect. Subsequently the anions will block the oxygen reduction in the defect so as to slow the corrosion reaction.

In addition, this provides a marker or indication that such corrosion has begun to occur. Generally, the color of the electrochemically reduced coating adjacent to the defect is different than the surrounding coating. This distinguishes the corrosion or defect area from the other areas of the coating. Therefore, the owner of the object is made aware that a defect of the coating has occurred and can be provided with an opportunity to address the situation so that further damage to the metallic substrate can be avoided.

A first embodiment of the present invention includes a method for inhibiting corrosion of a metallic substrate with a coating when an imperfection occurs in the coating. First, a metallic substrate is coated with a film that includes a releasable inhibiting anion. The inhibiting anion includes a basic anion of an organic or inorganic acid. Next, the film is reduced via electron uptake from a galvanic reaction between the metallic substrate and the coating acting as an oxidizer surrounding the metallic substrate where a portion of the metallic substrate is not coated. Then, inhibiting anions are released from the film when the film is reduced because it is galvanically connected to the metal through a corrosive electrolytic environment.

A second embodiment of the invention includes an oxidation inhibition film for a metallic substrate that inhibits oxidation on the substrate when a portion of the metallic substrate is exposed through the film. The film comprises a polymer and a dopant. The dopant includes an anion that is a basic anion of an organic or inorganic acid that may associate with the polymer. Furthermore, the dopant disassociates from the polymer when the metallic substrate begins to oxidize.

A third embodiment of the present invention includes a film to inhibit an oxidation of a metallic substrate at a region of the metallic substrate not substantially covered by the film. The film substantially coats the metallic substrate. The film includes a conductive polymer and an anionic dopant. The anionic dopant may associate with the conducting polymer. The anionic dopant is also releasable from the film when the film becomes reduced as a result of being galvanically coupled in the presence of a corrosive electrolyte to the metal existing at the base of a defect in the coating.

A fourth embodiment of the present invention includes a system, including a film, to inhibit the oxidation of a metallic substrate in an environment including chloride ions. The film comprises a polymer able to conduct electrons or holes when acidified with an acid. A hole is transported by moving an absence of electrons through a system. The system further includes an organic acid that includes at least one sulfur atom. The organic acid is able to associate with the polymer by protonating the polymer and providing the anion as a counter ion.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the preferred embodiment(s) is merely exemplary in nature and is in no way intended to limit the invention, its application, or uses.

Figure 1:
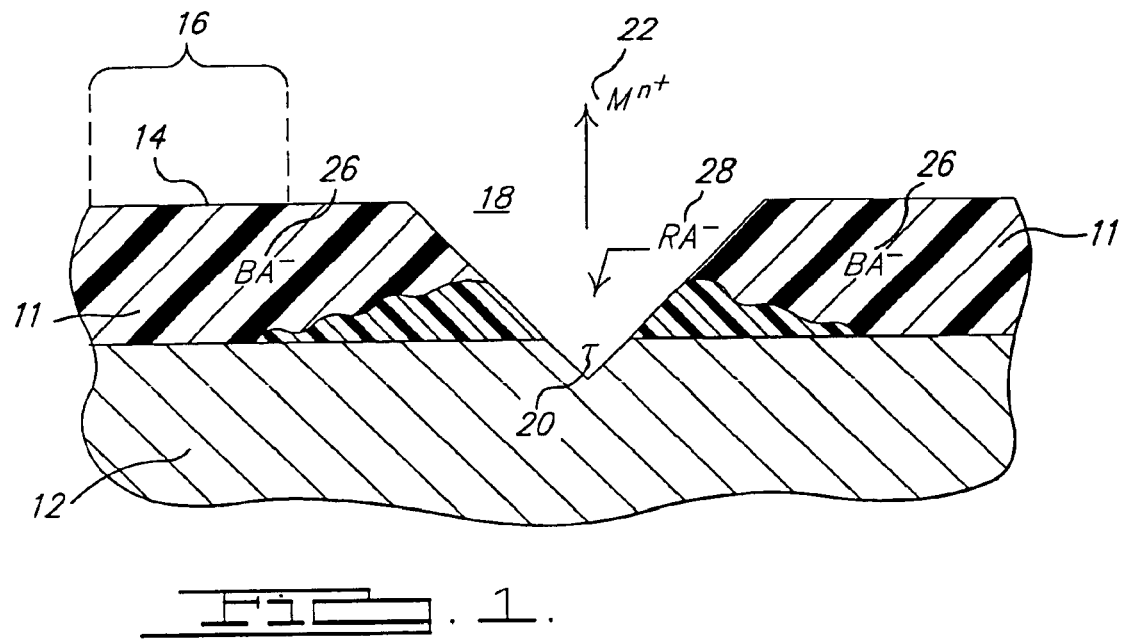
FIG. 1 is a cross-sectional view of a substrate including a defect and a film according to a first embodiment of the present invention.

A corrosion inhibition system 10 is illustrated in FIG. 1. The corrosion inhibiting system 10 generally includes a film or coating 11 placed on a substrate 12. The substrate 12 is generally a metallic substrate formed of a unitary piece of metal or several portions affixed together. Also, the particular alloy is not of particular relevance, except that the alloy is generally one that may be oxidized. Moreover, the metallic substrate may also include a pure metal. An exemplary metallic substrate 12 may be an aluminum alloy including copper.

The coating 11 may include a conducting polymer such that a current or electron transfer may occur through the coating 11. After the coating 11 is applied to the metallic substrate 12, the coating 11 has an exterior surface 14 which is substantially smooth and complete as in region 16. Generally, the coating 11 provides substantial protection to the metallic substrate 12 when there are no defects in the coating 11. Nevertheless, during the use of the metallic substrate 12, a coating defect 18 may occur in the coating 11 which also creates a substrate defect 20 in the metal substrate 12. When this occurs, bare metal from the metallic substrate 12 is exposed to the atmosphere. This may lead to oxidation of the metallic substrate 12.

One mechanism for oxidation of the metallic substrate is the Oxygen Reduction Reaction (ORR) which is the reduction of oxygen from the atmosphere to produce negative hydroxyl ions. ORR is illustrated in the chemical equation ½ $O_2 + H_2O + 2\ e^- \rightarrow 2\ OH^-$. When ORR occurs, electrons transfer from a metal atom of the metallic substrate 12 that is oxidized to produce a metal ion 22. The ORR can occur both at sites within the defect 20, for example at surfaces of microscopic secondary phases in the alloy, or on the surface of the conducting polymer 16. The two electrons required by the reaction of ½ of one molecule of oxygen by the ORR come from oxidation of metal to a metal cation in the defect. The oxidized metal ion 22 is generally not strongly adhered to the metallic substrate 12 and easily comes away from the metallic substrate 12. When this occurs, corrosion continues in the metallic substrate 12. This reaction induces the metallic substrate 12 into an anodic activity.

The coating 11 is preferably a conductive coating so that some of the electrons being driven away from the metallic substrate 12 transfer into the molecular structure of the coating 11 producing a non-conductive product 24 near the substrate defect 20. This increases the electronic resistance between the metallic substrate 12, which is acting as the anode, and the oxygen from the atmosphere at the polymer in or on the coating 11, which is acting as the cathode.

In addition, the coating 11 may be doped or synthesized to include a bound active inhibitor or inhibiting anion (BA) 26 in a form that is first bound in the polymer. Although only two BAs 26 are illustrated, it will be understood that a plurality may be dispersed throughout the coating 11. When the non-conducting product 24 is produced, the coating 11 in the area of the coating defect 18 becomes more basic. Without being bound by the theory, the reduction of the coating 11 allows the release the BA 26 which forms a released active inhibitor or anion (RA) 28, from the BA 26, into the coating defect 18. Moreover, as the film 11 is reduced the faster or greater the amount of the RA 28 is produced upon the release of the BA 26. In particular, the BA 26 may be released from the coating 11, thereby forming the RA 28, such that the RA 28 enters the substrate defect 20 to further inhibit the corrosion or oxidation of the metallic substrate 12. In this way, the RA 28, which was doped into the coating 11 as BA 26, help slow the oxidation or corrosion of the metallic substrate 12 substantially only when the coating defect 18 occurs and also impinges the metallic substrate 12 to form the substrate defect 20.

A further exemplary mechanism for the release of the BA 26 may include deprotonation or deacidifying of the coating 11. Not only does the production of the non-conducting product 24 release the BA 26, but the hydroxyl group $OH^-$, from the ORR occurring on or in the coating, may help make basic the coating 11 which further helps release the BA 26. Generally, the hydroxyl group $OH^-$ from the ORR attracts a proton $H^+$ from the coating 11 such that the BA 26 is released from the coating 11. In this way, the BA 26 may also be released through the second mechanism to help inhibit the corrosion of the metallic substrate 12.

An electrically conductive polymer is desired to produce the coating 11 to help release the BA 26 under the appropriate conditions. Essentially, the conductive polymer allows the coating 11 to react to a transfer of electrons in a unique way. A non-conductive coating may not allow for such an easy transfer of the BA 26 to the metallic defect 20 to inhibit the corrosion thereof.

Any number of inorganic or organic acids (HA) may be used as a reactant to produce the BA 26. Provided that the HA is strong enough to protonate the coating 11, thus releasing its anion which becomes dispersed and intermingled yet fixed in the coating 11 as a "dopant" anion or the BA 26 when the coating 11 exists in its oxidized and conducting form. Moreover, the BA 26 must be able to migrate through the coating 11 so that it migrates into the substrate defect 20 to inhibit further corrosion. This type of interaction is found with a conducting polyaniline system.

Figure 2:
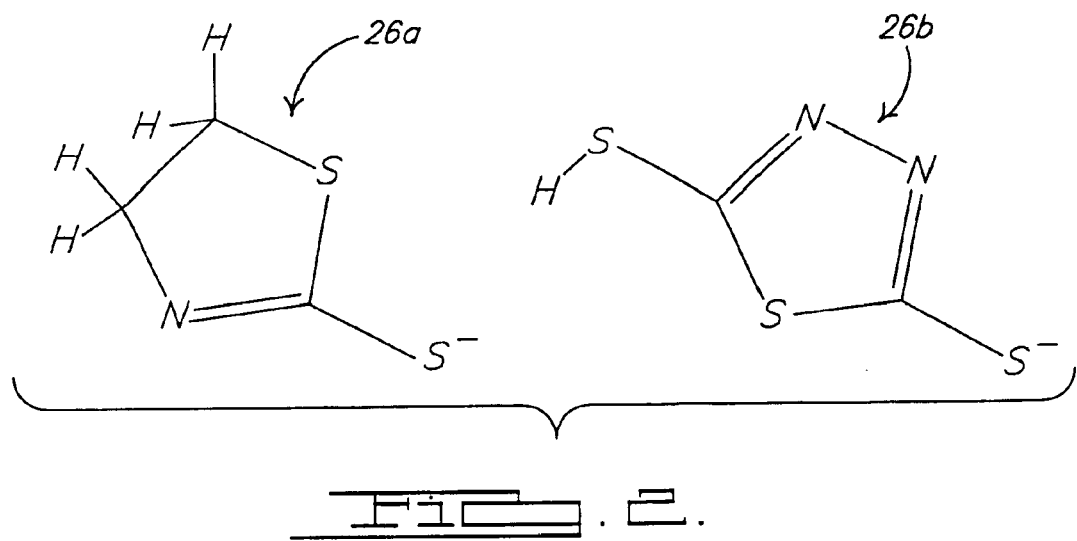
FIG. 2 is a molecular formulae for two anions according to two embodiments of the present invention.

Although many appropriate BAs 26 may be used, exemplary BAs 26 include mono and dithiols which are derived from mono and dithiol organic acids (HA). The BA 26 is the anion of the HA which is the dopant in the coating 11. Thiols have been found to be effective when aluminum alloys are being protected. This is especially the case when the aluminum alloys includes Cu-rich secondary phases. Monothiols of the general formulation RSH, where R is an organic radical and may disassociate into $RS^- H^+$, where $RS^-$ is the BA 26. One example of an appropriate monothiol includes 2-mercapto thiazoline, which produces the BA 26$a$, illustrated in FIG. 2. Dithiols have the general formulation HSRSH, where R is any organic radical. Dithiols may disassociate into $HSRS^- H^+$, where $HSRS^-$ is the BA 26. An example of a dithiol includes 2,5-dimercapto-1,3,4-thiadiazole which produces the BA 26$b$. Other examples of acids which produce appropriate BAs 26 include: 6-ethoxy-2-mercaptobenzothiazole, 1,3,4 thiadiazole, 6-ethoxy-2-mercaptobenzothiazole, dimethyldithiocarbamic acid, o-ethylxanthicacid, 2-mercaptobenzothiazole, 2-mercaptoethanesulfonic acid, diethyldithiocarbamic acid, 5-amino-1,3,4,-thiadiazole-2-thiol, 2-mercaptobenzoxazole, 2,1,3-benzothiazole, 1-pyrollidinecarbodithioic acid, 1-(4-hydroxyphenyl)-1H-tetrazol-5-thiol, 2 mercapto-5-nitrobenzimidazole, benzothiazole, 2-mercaptobenzoazole, and 2-mercapto-5-methylbenzimidazole. In each of these examples the acid is deprotonated to produce a proton and an anion, where the anion is the BA 26.

The above listed compounds are merely exemplary and other appropriate inhibiting anions exist. Appropriate BAs 26 interact with the coating 11 strongly enough such that the BAs 26 are able to be held in position, yet may be released to form the RA 28 when called upon or can be activated due to the anodic activity of the metallic substrate 12.

Coating 11 is preferably made of a conducting polymer or a polymer resin/conducting polymer blend that is inherently conductive. Although many appropriate polymers or polymer blends may be used to form the coating 11, one example is a polyaniline having a formula illustrated at 30 in FIG. 3. This polyaniline may either be synthesized from aniline monomers or may be purchased from a supplier such as Aldrich®. In any case, the polyaniline, depending on its oxidation state or degree of protonation can then be reacted with the appropriate HA or BA 26 base, as described further herein.

The BA 26 may be introduced into the coating 11 using a means suitable to provide the interaction of the HA with the conducting polymer of the coating 11. Generally, the conducting polymer in the oxidized and unprotonated form may accept an oxidizing proton from the HA, such that the polymer becomes positive and the BA 26, derived from the HA, becomes associated with the coating 11 that is now protonated. This allows for an association of the BA 26 at specific locations along the polymer chain of the coating 11, but also allows the BA 26 to be released when the coating 11 becomes basic or is reduced electrochemically.

Appropriate methods for doping the coating 11 include synthesizing the coating to include the BA 26. The oxidized protonated form of the coating 11 has the BA 26 disbursed throughout the coating 11 before the coating is applied to the metallic substrate 12. This allows for an even and substantially thorough distribution of the BA 26 in the coating 11 over the entire surface of the metallic substrate 12. Another exemplary method includes saturating an area of the oxidized unprotonated form of coating 11 with the HA such that the coating 11 becomes doped. This process occurs after the coating 11 has been applied to the metallic substrate 12.

Another alternative for doping the coating 11 includes an anion exchange. The coating 11 may be coated on to the metallic substrate 12 including an original or coating anion. The coating 11 is then oxidized. Once this has occurred a salt of the BA 26 may be placed in contact with the coating 11, as described herein, or using other appropriate methods. The original anion is then exchanged with the BA 26 from the salt solution. More particularly the film 11, in this instance, is a cationic film that includes the original anion as a counter anion. The BA 26 then replaces the original anion to become the counter anion in the film 11.

An alternative anion exchange mechanism may also be used where an original or coating anion is first placed in the film with another acid. First protonation of the unprotonated coating is performed using a strong acid, that includes the original anion. This reaction is followed by an ion exchange of the original anion with the BA 26.

Regardless of the method used to apply the BA 26 to the coating 11 once the coating 11 has been doped with the BA 26, it can be used to inhibit corrosion on the metallic substrate 12 when a substrate defect 20 occurs. The general method of the inhibition has been described above. The following examples provide specific examples of particular BA 26 dopants, which are appropriate with a particular conductive coating placed on an aluminum alloy substrate. It will be understood the other substrates may be coated with films including the inhibitors described herein to carry out the present invention.

EXAMPLES

Example 1

Mechanism of Doping Conductive Polymer

Figure 3:
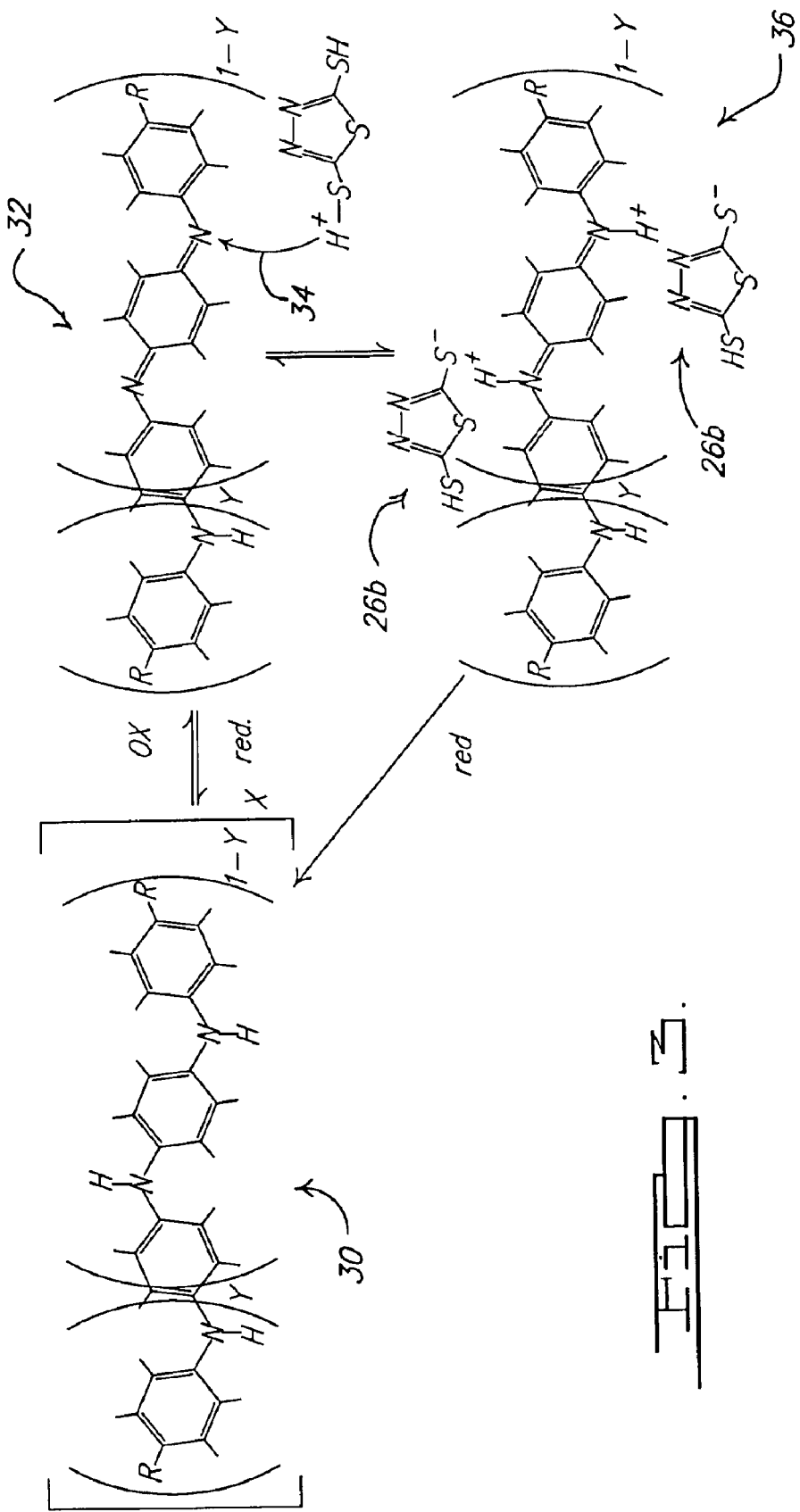
FIG. 3 is a molecular formula of a conductive polymer according to the first embodiment of the present invention.

A polyaniline emeraldine base (the oxidized unprotonated form of PANI), which may be obtained from Aldrich, 10-20 gm of which is dissolved in 100 ml of N-methylpyrrolidone so as to make a thick paint-like solution. A No. 13 Meyer bar is used to draw a portion of the solution into a film covering a surface of an Al 2024-T3 aluminum alloy test panel, which may be prepared as described herein, and allowed to dry and cure to form the solid film of PANI. The PANI film includes a polymeric structure that allows for the transfer of electrons through the film. With reference to FIG. 3, the PANI film may have a general structure that is reduced and unprotonated (that is also non-conducting) represented by 30. The reduced and unprotonated PANI film 30 also has an, and is generally received in, an oxidized and unprotonated or basic form (which is non-conducting) PANI 32, wherein at least one of the nitrogens of the reduced PANI 30 has lost a previously bound proton and has been oxidized to form the N═C bond. This forms a site where a proton and the BA 26 may associate with the nitrogen, through reaction 34, to produce the oxidized and protonated PANI 36 which has been doped with the BA 26. This reaction may proceed by the reaction of HA with the oxidized and deprotonated PANI 32 or by first protonation of the oxidized and deprotonated PANI 32 with a strong acid (including an acid ion) followed by ion exchange of the acid ion with the BA 26. For the oxidized PANI structure 32 a number of the monomer units of the polymer chain can accept one molecule of the singly-charged BA 26. Therefore, the density of the BA 26 can be fairly high in the coating 11. The reaction 34 shows how the appropriate BA 26 interacts with the oxidized PANI 32 to form the doped PANI 36.

Example 2

A three inch by three inch (3"×3") (76.2 mm×76.2 mm) test panel of aluminum alloy Al2024-T3⁻ is first degreased with acetone and deoxidized in Sanchem 1000® at about 37° C. for about 15 minutes followed by a de-ionized water rinse. The panel is then dried and coated with oxidized PANI 32 as prepared and described above. The coating of the oxidized PANI 32 is allowed to air dry and cure at room temperature. The PANI coating is then doped with 2,5 dimercapto—1,3,4,-thiadiazole (2,5 dopant).

The 2,5 dopant is provided at a concentration of about 0.02M. The 2,5 dopant is placed in a sealed and gasketed cell such that approximately 8 cm$^2$ of the test panel is exposed to the 2,5 dopant. The 2,5 dopant is expected to acidify the oxidized PANI 32 and dope the coating via reaction 34. The cell is affixed to the test panel for approximately 24 hours. After the 24 hour exposure period, the cell is removed and the panel rinsed and dried. After the doping procedure, a change in hue of the area doped is visible.

The test panel is then scribed, such that a mark is made in the coating which passes through the coating and creates a defect in the aluminum substrate, such that bare metal is exposed through the coating. After scribing the test panel such that the scribe intersects both the doped and undoped area, the test panel was exposed to a salt fog. The salt fog met the standards of ASTM B117 for testing.

The test panel is exposed to the salt fog for at least 130 hours. At various times throughout the testing phase the test panel is observed for corrosion. At no time during the test phase, nor after the test phase, is a large quantity of corrosion product noted in the doped area. While outside of the doped area, extensive corrosion product is found in the scribe. Therefore, the doped region of the coating substantially decreases or inhibits any harmful corrosion of the metallic substrate.

Example 3

A test panel aluminum alloy Al2024-T3 of approximately 3"×3" is substantially prepared as described in Example 2. After the test panel is prepared properly, a coating of CorrPassiv 900226119® by Zipperling is applied to the test panel and allowed to cure at room temperature. After the coating cures at room temperature for about 24 hours, a cell having an open surface area of approximately 8 cm$^2$ is affixed to a portion of the test panel. The cell includes about 0.02M concentration of a 2-mercapto thiazoline dopant. The dopant is exposed to the test panel for approximately 24 hours. After the dopant is applied, the doped area includes a visible color change from the undoped area.

After the test panel is doped, a scribe is placed upon the test panel that intersects both the doped and undoped areas. After the test panel is scribed it is placed in the salt fog as described above. The test panel is again exposed to the salt fog for at least about 130 hours. During the test process, the test panel is observed at several time intervals. Substantially no corrosive product is found in the scribe in the doped area either during or at the end of the test process. Nevertheless, found in the scribe in the undoped area is a significant amount of corrosive product. Therefore, the area of doped coating is a significant inhibitor to corrosive activity in the salt fog.

It is understood that the above are merely exemplary methods to dope the film 11 to cover a substrate 12. The film 11 may be doped with the appropriate BA 26 through any number of methods. For example a film 11, or the polymer thereof, may include an original anion. The original anion may then be exchanged for the inhibiting BA 26 into an oxidized form of the film 11 from a solution of a salt of the inhibiting BA 26.

Figure 4:
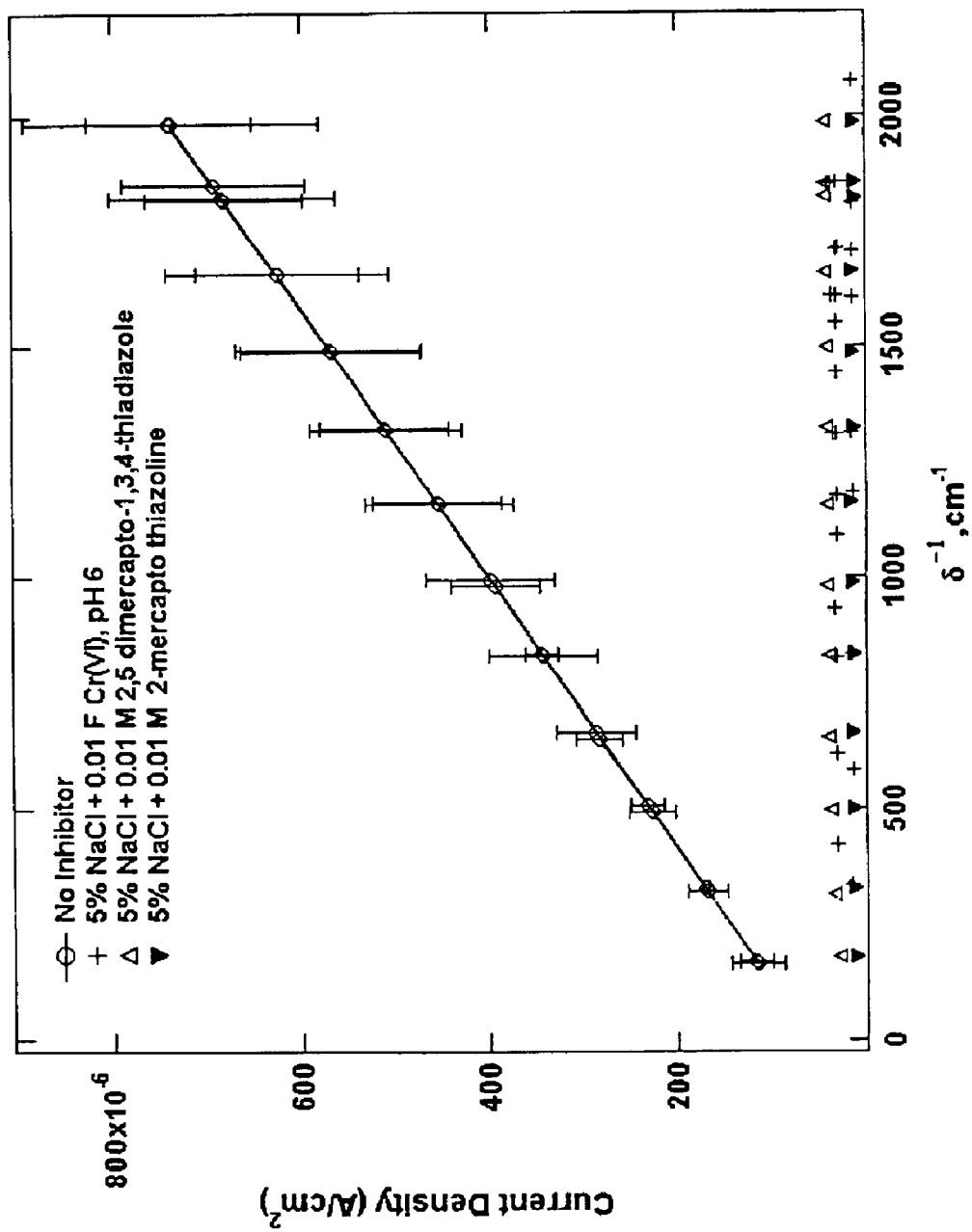
FIG. 4 is a graph of the current densities of a solution including anions according to various embodiments of the present invention.

Cathodic currents of the ORR, flowing to a rotating copper electrode polarized to −0.7 V vs SCE were determined as a function of the rotation rate in 5% sodium chloride in the presence of both the anions from Examples 2 and 3 at 0.01 M concentration and in their absence. The following results are exemplary of the dopants described in Examples 2 and 3 above, they are not meant to limit the scope of the present invention in any way. These cathodic currents are proportional to the rate of the ORR. The results of these galvanic measurements are shown graphically in FIG. 4. FIG. 4 illustrates the current densities plotted as a function of the inverse diffusion length, $\delta^{-1}$. $\delta=1.75\ \omega^{-1/2} v^{1/6} D^{1/2}$, where $\omega$ is the rotation rates of the Cu rotating disk electrode (RDE), D=2 10$^{-5}$ cm$^2$/s, and v=1 cP. The results of both are compared to the results in the presence of chromate, which is generally known. The current density dramatically increases over the range of inverse diffusion lengths observed of the rotating copper electrode if there is no inhibitor. The anionic dopants, exemplary of the current invention, significantly decrease or almost eliminate current density over the observed range of inverse diffusion lengths. Moreover, the inhibition due to the RA 28 is substantially similar or better than that of the currently known chromate inhibitor. Therefore, the use of the RA 28 substantially reduces the current density for the ORR that drives the oxidation of a metal or alloy, when exposed to a corrosive environment.

Without being bound by the theory as described above, it is believed that the coating 11 does not anodically passivate the metallic substrate 12, but rather blocks the oxygen reduction half of the corrosion reaction responsible for transforming the metallic substrate 12 into some form of the oxidized ion 22, be it an oxide, hydroxide or aquated metal ion complex. As the galvanic reaction occurs, the coating 11 is reduced to produce the non-conductive product 24, which occurs substantially near the substrate defect 20 in the metallic substrate 12. This increases the electronic resistance between the site of metal ion formation and ORR, thereby decreasing the corrosive reaction rate of the metallic substrate 12.

In addition, when the coating 11 is reduced and becomes non-conductive, it releases the dopant BA 26 to form RA 28 which moves into the defect where it inhibits the ORR occurring at cathodic sites which exist within the metallic surface of the defect 20. Furthermore, the ORR generates a basic byproduct, which can further deacidify the coating 11. This in turn creates an additional release of the RA 28 near the substrate defect 20. Both of these actions cause the release of the BA 26 near the coating defect 18. As the RA 28 enters the coating defect 18, it further slows the reduction of oxygen that drives the anodic dissolution at 20.

Thus, the present invention allows for an "intelligent" release of the BA 26, which is the corrosion inhibitor, into a substrate defect 20 only after the substrate defect 20 occurs and a corrosive environment is present. Rather than having a time release or steady release of the inhibiting product, the BA 26 of the present invention, when placed in the coating 11, is released only when a galvanic reaction occurs near the coating defect 18. Substantially only when the coating defect 18 occurs and a corrosive environment is present is there a substantial possibility of the metallic substrate 12 becoming corroded. Thus, the coating 11 of the present invention does not lose its corrosion inhibiting properties over time, but rather retains its inhibiting properties until they are needed. The BA 26 is generally needed or released when the coating defect 18 and the substrate defect 20 are produced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for inhibiting corrosion of a metallic substrate with a coating when an imperfection occurs in the coating, comprising:
    selecting an inhibiting anion from a group consisting of thiols;
    coating the metallic substrate with a cationic film that includes an effective amount of the selected inhibiting anion;
    reducing the cationic film via electron uptake from a galvanic reaction between the metallic substrate and an oxidizer surrounding the metallic substrate where a portion of the metallic substrate is not coated; and
    releasing the anion when said cationic film is reduced, wherein releasing the anion substantially inhibits the corrosion of the metallic substrate.

2. The method of claim 1, wherein said inhibiting anion is formed from an acid that is able to become associated with said cationic film when said acid protonates said film.

3. The method of claim 2, wherein said inhibiting anion is disassociable from said film when said cationic film is made more basic than when it said cationic film is protonated.

4. The method of claim 2, wherein said inhibiting anion is disassociable from said cationic film when said cationic film is reduced.

5. The method of claim 1, wherein said cationic film includes a polymer able to conduct an electric current when a potential is applied to said polymer,
    wherein said film is able to conduct electricity.

6. The method of claim 1, wherein said inhibiting anion is derived from a molecule selected from a group including acidic thiols or non-acidic thiols.

7. The method of claim 1, wherein said inhibiting anion is formed from dissociation of an organic acid that is associated with said cationic film.

8. The method of claim 1, wherein said coating the metallic substrate includes applying said film in an oxidized state.

9. An The method of claim 8, wherein including an inhibiting anion includes:
    protonating the coating with an acid including an acid anion; and
    exchanging the acid anion with the inhibiting anion.

10. The method of claim 1, wherein reducing the cationic film further includes electron uptake from a galvanic reaction between the metallic substrate and the cationic film surrounding the metallic substrate where a portion of the metallic substrate is not coated.

11. The method of claim 1, wherein selecting an inhibiting ion from a group comprising thiols includes selecting at least one of a mono-thiol, di-thiol, poly-thiol, or combinations thereof.

12. The method of claim 1, selecting an inhibiting ion from a group comprising thiols includes selecting at least one of 2,5-dimercapto-1,3,4-thiadiazole; 6-ethoxy-2-mercaptobenzothiazole; 1,3,4 thiadiazole; 6-ethoxy-2-mercaptobenzothiazole, dimethyldithiocarbamic acid; o-ethylzanthicacid; 2-mercaptobenzothiazole; 2-mercaptoethanesulfonic acid; diethyldithiocarbamic acid; 5-amino-1,3,4, -thiadiazole-2-thiol; 2-mercaptobenzoxazole; 2,1,3-benzothiazole; 1-pyrollidinecarbodithioic acid; 1-(4-hydroxyphenyl)-1H-tetrazol-5-thiol; 2 mercapto-5-nitrobenzimidazole; benzothiazole, 2-mercaptobenzoazole; or 2-mercapto-5-methylbenzimidazole.

13. A method for inhibiting corrosion of a metallic substrate with a coating when an imperfection occurs in the coating, comprising:
    selecting an inhibiting anion from a group comprising thiols;
    coating the metallic substrate with a cationic film that includes an effective amount of the selected inhibiting anion;
    reducing the cationic film via electron uptake from a galvanic reaction between the metallic substrate and an oxidizer surrounding the metallic substrate where a portion of the metallic substrate is not coated; and
    releasing the anion when said cationic film is reduced, wherein releasing the anion substantially inhibits the corrosion of the metallic substrate;
    wherein the inhibiting anion is added to the cationic film by a method including:
        forming said cationic film with an original anion;
        converting the cationic film into an oxidized form of the cationic film; and
        exchanging the original anion with the inhibiting anion from a solution of a salt of the inhibiting anion.

14. The method of claim 13, wherein said inhibiting anion is formed from an acid that is able to become associated with said cationic film when said acid protonates said film.

15. The method of claim 14, wherein said inhibiting anion is disassociable from said film when said cationic film is made more basic than when said cationic film is protonated.

16. The method of claim 14, wherein said inhibiting anion is disassociable from said cationic film when said cationic film is reduced.

17. The method of claim 13, wherein said inhibiting anion is formed from dissociation of an organic acid that is associated with said cationic film.

18. The method of claim 13, wherein said cationic film substantially reduces oxidation of the metallic substrate when said cationic film is exposed to an environment more basic than the environment when said cationic film was protonated.

19. A method for inhibiting corrosion of a metallic substrate formed of aluminum or an alloy including aluminum with a coating when an imperfection occurs in the coating, comprising:

selecting an inhibiting anion from a group comprising thiols;

coating the metallic substrate with a cationic film that includes an effective amount of the selected inhibiting anion;

reducing the cationic film via electron uptake from a galvanic reaction between the metallic substrate and an oxidizer surrounding the metallic substrate where a portion of the metallic substrate is not coated; and releasing the anion when said cationic film is reduced, wherein releasing the anion substantially inhibits the corrosion of the metallic substrate.

20. A method for inhibiting corrosion of a substrate susceptible to corrosion, comprising:
(a) applying a corrosion-inhibiting amount of a thiol in a cationic electrically conductive carrier to the substrate; and
(b) inhibiting corrosion of the substrate by releasing anions of the thiol when the substrate is exposed to a reducing environment.

21. The method of claim 20, wherein said cationic electrically conductive carrier includes a polymer able to conduct an electric current when a potential is applied to said polymer.

22. The method of claim 20, wherein said anions of the thiol are disassociable from said cationic electrically conductive carrier when said cationic electrically conductive carrier is reduced.

23. At The method of claim 20, wherein said anions of the thiol are formed from dissociation of an organic acid that is associated with said cationic electrically conductive carrier.

24. The method of claim 20, wherein said applying a corrosion-inhibiting amount of a thiol in a cationic electrically conductive carrier to the substrate includes applying said cationic electrically conductive carrier in an oxidized state.

25. The method of claim 20, wherein applying a corrosion-inhibiting amount of a thiol in a cationic electrically conductive carrier to the substrate further comprises forming a coating on the substrate.

26. The method of claim 25, wherein said forming a coating comprises:

protonating the coating with an acid including an acid anion; and exchanging the acid anion with the anions of the thiol.

* * * * *